A. Nobel.

Making Nitro-Glycerine.

No. 3,382. Reissued Apr. 13, 1869.

Witnesses
Octavius Knight
Wm B Denny

Inventor
James Devean

THE UNITED STATES BLASTING-OIL COMPANY, OF NEW YORK, N. Y., ASSIGNEES OF ALFRED NOBEL.

IMPROVED PROCESS OF MANUFACTURING NITRO-GLYCERINE.

Specification forming part of Letters Patent No. 57,175, dated August 14, 1866; reissue No. 2,538, dated April 2, 1867; reissue No. 3,382, dated April 13, 1869.

DIVISION 2.

*To all whom it may concern:*

Be it known that ALFRED NOBEL, of the free city of Hamburg, Germany, invented a new and Improved Method or Process of Manufacturing Nitro-Glycerine, or analogous substances, such as nitrine, &c., the said process being an improvement upon the method described in his Letters Patent No. 50,617, dated October 24, 1865.

The particular object of this invention, which we are about to describe, is the improvement of apparatus adapted to the process of manufacturing nitro-glycerine, as well as nitrine, or crystallizing nitro-glycerine, whether made with fuming nitric acid, or nitric acid free, or comparatively free, from hyponitric acid.

The process and mechanical apparatus invented by the said NOBEL for manufacturing nitro-glycerine, we describe as follows, having reference to the drawings hereto annexed.

Figure 1:
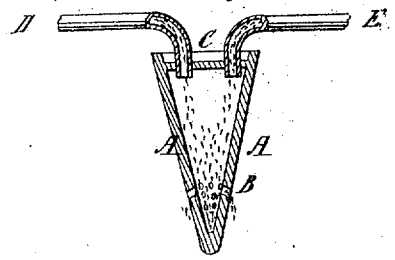

In the drawing, Figure 1 represents a funnel-shaped vessel, made of stone, lead, or other suitable material.

A is the vessel; B, perforations through the vessel. C is a cover, and D and E are tubes connected with reservoir-tanks, of sufficient elevation to allow the influence of gravitation and atmospheric pressure to force the liquids contained to descend in such manner that they will mingle or mix before they reach the water in which the said vessel is placed. There may be perforated disks in the said funnel-shaped vessel, placed so that the liquids will have additional opportunity to mix before they reach the water. The glycerine being thus mixed with the acids, nitro-glycerine will be formed, which, when in the water, separates from the acids. The glycerine should enter the vessel through the pipe D, and the acids, one part nitric acid, say 48° Baumé specific gravity, and two parts sulphuric acid, say 66° Baumé specific gravity, through the other pipe E.

Figure 2:
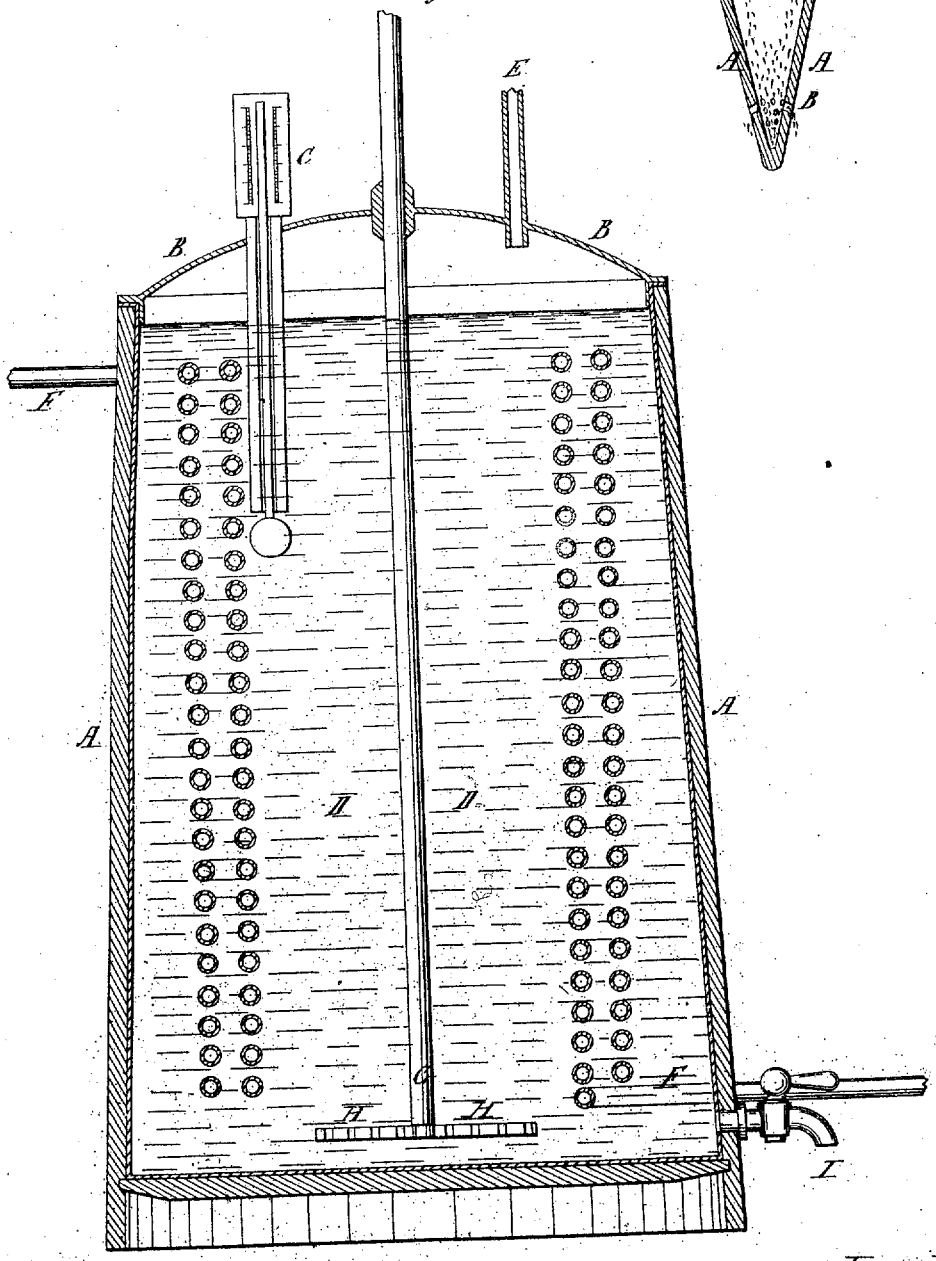

Fig. 2 represents another mode or process of manufacturing.

A A is a tank or vessel, made of stone, lead, or other suitable material, which will not be injuriously affected by the action of the acids. B B is the cover on the tank or vessel. C is a thermometer, intended to be suspended into the liquid D in the tank. E is a pipe, entering the tank through the cover B B, to conduct glycerine from a reservoir above into the tank. F F is a worm, or coil of lead, or of other suitable material, to conduct cold water from a reservoir above, in order to cool the liquid within the tank. G G is a rod, made of suitable material, having attached thereto a perforated disk, H H. The rod is attached above to any known mechanical contrivance that will cause it to be raised and lowered at the will of the manipulator. I is a faucet, through which the mixed material or liquids will be drawn from the tank A A.

The operation of this apparatus is as follows: The vessel A A is filled with the necessary quantity of mixed acids, in the proportions of, say, one part, more or less, of nitric acid, and two parts, more or less, of sulphuric acid. This mixed acid is brought to a low temperature, say 32° Fahrenheit, and the dasher H H on the rod G G is put in motion, up and down, which produces agitation of the liquids. The glycerine is then allowed to flow into the tank A A, through the tube E, in such quantities as the temperature may justify. The temperature will rise and fall in proportion to the agitation and introduction of the glycerine, which can be adjusted by a faucet attached to the pipe or tube E. Ordinarily, one pound of glycerine is compounded with eight pounds of mixed acids, according to the foregoing proportions of acids. A change may be made from this formula, according to the quality of the acids and glycerine, respectively. When the glycerine and acids have been thus treated by agitation, to the extent of the formula, they are then discharged into a tank or vessel containing water, one part of the said mixture to eight parts or more of pure water. This acidulated water is well stirred, which agitation separates the nitro-glycerine from the acids. The specific gravity of the nitro-glycerine is about 1.80° Baumé, or six-tenths heavier than water.

The acids, becoming diluted by the water, are lighter, and the nitro-glycerine being heavier, falls to the bottom of the tank.

In this manner, and by the contrivances mentioned, NOBEL accomplishes the manufacture of nitro-glycerine in any desired quantity, more economically than can be accomplished by any hitherto known mode.

Having thus described the process of manufacturing nitro-glycerine sufficiently clearly to enable others skilled in the art to which it belongs to make and use the same, what we claim as the invention of the said ALFRED NOBEL, and desire to secure by Letters Patent, is—

The combination and use of the vessel or tank A A, the worm F F, the dasher G H, for the purpose of containing, cooling, and agitating the acids and glycerine in the process of making and compounding nitro-glycerine in the manner substantially as hereinbefore described.

TAL. P. SHAFFNER,
*President, &c.,*
JAMES DEVEAU,
*Secretary of the United States Blasting-Oil Company.*

Witnesses:
OCTAVIUS KNIGHT,
WM. B. DEMING.